US008452160B2

(12) United States Patent
George

(10) Patent No.: US 8,452,160 B2
(45) Date of Patent: May 28, 2013

(54) SYSTEM AND METHOD FOR PORTRAYAL OF OBJECT OR CHARACTER TARGET FEATURES IN AN AT LEAST PARTIALLY COMPUTER-GENERATED VIDEO

(75) Inventor: Stephen Paul George, San Diego, CA (US)

(73) Assignee: Sony Online Entertainment LLC, San Diego, CA (US)

( * ) Notice: Subject to any disclaimer, the term of this patent is extended or adjusted under 35 U.S.C. 154(b) by 1111 days.

(21) Appl. No.: 12/134,276

(22) Filed: Jun. 6, 2008

(65) Prior Publication Data

US 2008/0317432 A1 Dec. 25, 2008

Related U.S. Application Data

(60) Provisional application No. 60/936,721, filed on Jun. 20, 2007.

(51) Int. Cl.
*H04N 5/93* (2006.01)

(52) U.S. Cl.
USPC .......................................................... 386/287

(58) Field of Classification Search
None
See application file for complete search history.

(56) References Cited

U.S. PATENT DOCUMENTS

| 4,710,873 | A | 12/1987 | Breslow et al. |
| 6,283,858 | B1 | 9/2001 | Hayes, Jr. et al. |
| 6,285,381 | B1 | 9/2001 | Sawano et al. |
| 6,894,686 | B2 * | 5/2005 | Stamper et al. ............... 345/419 |
| 2003/0159143 | A1 * | 8/2003 | Chan .............................. 725/41 |
| 2003/0190954 | A1 | 10/2003 | Sitrick |
| 2003/0228135 | A1 * | 12/2003 | Illsley ............................ 386/52 |
| 2005/0171964 | A1 * | 8/2005 | Kulas ........................... 707/100 |

FOREIGN PATENT DOCUMENTS

| WO | 2007016596 A2 | 2/2007 |
| WO | 2007035558 A2 | 3/2007 |
| WO | 2007081941 A2 | 7/2007 |

OTHER PUBLICATIONS http://poodree.net/opportunity2006/pdf/14xidtech.pdf, "XID Technologies—The Face Processing Company", 2006, 4 pages.
Birn, Jeremy, "Notes from SIGGRAPH 2000", www.3drender.com/updates/siggraph00.html, Jul. 28, 2000, 5 pages.
Kleiser, Jeff, "Synthespianism", http://www.kurzeilai.net/meme/frame.html?main=/articles/art0526.html, Oct. 5, 2002, 13 pages.

* cited by examiner

*Primary Examiner* — Brandon Hoffman
(74) *Attorney, Agent, or Firm* — Mayer & Williams PC; Mark D. Wieczorek

(57) ABSTRACT

Consumers may appear to be featured in videos by being appropriately photographed and their image mapped onto a character in a video. A pre-existing video file has a computer-generated ("CG") actor rendered throughout, except in, e.g., a head region, where a consumer's image data will be mapped. The consumer's image data is mapped onto the CG actor, and the CG actor's animation track is mixed with the remainder of the video, completing the same. The consumer may choose from among several videos, depending on the genre they prefer. The system and method may also apply to marketing and advertising methods, especially with regard to targeted advertising and product placement.

21 Claims, 5 Drawing Sheets

SYSTEM AND METHOD FOR PORTRAYAL OF OBJECT OR CHARACTER TARGET FEATURES IN AN AT LEAST PARTIALLY COMPUTER-GENERATED VIDEO

CROSS-REFERENCE TO RELATED APPLICATION

This application claims the benefit of U.S. Provisional Patent Application Ser. No. 60/936,721, entitled "Movie Star Studio", filed Jun. 20, 2007, owned by the assignee of the present invention and herein incorporated by reference in its entirety.

BACKGROUND

The ubiquity of digital cameras, both still and video, and subsequent proliferation of photo and video file-sharing websites, has accustomed consumers and users to appearing in their own home movies and photos and sharing the same with family and friends. Generally, however, no matter the budget, home movies do not enjoy significant production values as compared to movies from established studios. Moreover, the viewing of the same are relatively passive acts—users are watching events in which they have taken part, and hence in any such viewing the user is aware of what will happen.

In modern video games, especially role-playing games, consumers can enjoy high-quality production values and the same enjoy events in which they can personally take part (through their character). Generally the user has a new experience each time they play. However, while players can see their character on the screen, their character bears no resemblance to their actual person.

Finally, it is common in today's advertising to incorporate product placements in television shows, movies, music videos, sports broadcasting, and almost every other type of video or audio distribution. However, a particular video or audio is generally broadly distributed, and so a product placement that may be suitable for one demographic audience may be unsuitable for another.

SUMMARY

Certain embodiments of the system and method disclosed here address the deficiencies of the prior art as noted above, and furthermore provide a novelty item in which consumers may take considerable enjoyment.

Apparatus and methods are provided to implement a technique for generating video by modifying source data to change the appearance of one or more objects or characters in a scene. In one example, a system changes the appearance of a character in a video sequence (e.g., a movie) to resemble the appearance of a user by providing appropriate image data for the user.

In particular, the system and method of the invention provide for a short video to be created that is personalized to a target such as a consumer. The personalization is such that an image of the consumer, e.g., their head, is mapped onto a computer-generated ("CG") actor in the video, making the actor appear to be or to resemble the consumer in the video. In this way, consumers may purchase a DVD movie in which they appear to be the main actor. The deliverable of the system and method may be a video file stored on an appropriate medium, e.g., a DVD, or may alternatively be an electronic file to be downloaded or retrieved, or the like.

The consumer (or any other user) chooses from one or more videos, giving the consumer a choice of genre. The video has the CG actor rendered throughout, except for a particular region such as the head. The consumer, e.g., their head, is photographed from a number of angles, such that the same may be modeled in any orientation needed for the video. The image data of the consumer is mapped onto the CG actor model. The CG actor's animation track, including the textures taken from the consumer's image data, is combined with the main video track, completing the film.

The service may be made available in amusements parks, shopping malls and other tourist attractions, such as in a store or kiosk, or may be an online or downloadable application.

Variations include the following. The video may be a short film made for the purpose of the invention, a pre-existing film that has been appropriately altered, and so on. More than one consumer may be featured in the video. Rather than just a head image, the consumer's entire body may be featured in the video. An operator may fine-tune the video in various ways, such as by choosing one from a set of head model shapes on which the mapping is made, thereby improving the "fit" of the mapped image onto the model (the same is true for body shapes). Not only persons but also objects or animals may be featured. Rather than creating a new image via photography, image data may be directly provided to the system, allowing videos to be made of friends, historical figures, celebrities, and so on.

Other applications include advertising, e.g., one product could be substituted with another for purposes of targeted advertising, which may be made especially persuasive when combined with a way to sense demographic information about the targeted population.

In one aspect, the invention is directed towards a method of making a video employing a target visual image. Steps of the method include: receiving a target visual image; receiving a source video, the source video including a track in which a computer-generated object is defined; using the target visual image to form at least a portion of the computer-generated object; rendering at least the computer-generated object into a video format; and combining the rendered computer-generated object and the source video to form a final video.

Implementations of the method may include one or more of the following. The receiving a target video image step may include capturing an image of a face of the consumer. The photographing step may include photographing a head of the consumer from multiple angles. The source video may be pre-rendered. The receiving a source video step may include receiving a video including raw object data and replacing the raw object data with a computer-generated object to produce a source video. The target visual image may be a subject selected from a media library. The using the target visual image step may include mapping data corresponding to the visual image onto a pre-defined mesh constituting the computer-generated object to generate image textures thereon. The receiving a target visual image step may include receiving a data file including visual information. The method may further comprise any of the steps of: creating a medium with the final video thereon, posting the final video to a file-sharing site, or emailing the final video to an email address. The target visual image may be selected from the group consisting of: a consumer's body, a consumer's head, a consumer's face, and a product. The receiving a source video may include selecting a source video in which the size or shape of a computer-generated object within the source video corresponds to the size or shape of the target visual image, and the selecting may be performed by an operator or by a software application.

In another aspect, the invention is directed towards a system for making a video employing a target visual image from a consumer. The system includes: a target visual image acquisition module to receive target visual image data; a database to store one or more source videos, each source video including a track in which a computer-generated object is defined; a mapping module to map the target visual image data onto at least a portion of a mesh corresponding to the computer-generated object; a rendering module to render the computer-generated object into a video format; and a combining module to combine the rendered portion of the computer-generated object with the source video to produce a final video.

Implementations of the system may include one or more of the following. The system may further include a post-production module which: creates a DVD with the final video stored thereon, posts the final video to a file-sharing site, or emails the final video to an email address. The computer-generated object may be a computer-generated character, the target visual image reception module may receive head image data, and the mapping module may map the head image data onto a head area of a mesh corresponding to the computer-generated character. The target visual image reception module may include a camera or a data carrier receiver.

In yet another aspect, the invention is directed towards a method for creating a short film in which a consumer is displayed as an actor therein. Steps of the method include: photographing a consumer from at least two angles, and storing the photographic data obtained; receiving a video choice from a consumer, the choice corresponding to a selection of a source video from an assortment of at least two source videos, each source video having at least one track for a computer-generated actor, and in which the video is pre-rendered except for a head area of the computer-generated actor; mapping the photographic data of the consumer onto the head area of the computer-generated actor; rendering at least the computer-generated actor into a video format; combining the results of the rendering with the source video to result in a final video; and recording data corresponding to the final video onto a DVD.

Implementations of the method may include one or more of the following. The method may further include: photographing another consumer from at least two angles, and storing the photographic data obtained thereby; mapping the photographic data onto the head area of another computer-generated actor; and rendering the computer-generated actor and the another computer-generated actor into a video format. The steps of photographing, receiving, mapping, rendering, combining, and manufacturing may be performed in a kiosk. The method may further include providing a user interface in which the consumer can select the source video and control the photographing step.

In a further aspect, the invention is directed towards a method of advertising within videos employing targeted visual images. Steps of the method include: receiving a target visual image from a library of target visual images; receiving a source video, the source video including a track in which a computer-generated object is defined; using the target visual image to form at least a portion of the computer-generated object; rendering at least the computer-generated object into a video format; and combining the rendered computer-generated object and the source video to form a final video.

In one implementation, the method may further include receiving demographic information about a target audience of the final video, where the step of receiving a target visual image step may include choosing a target visual image from a library based on the demographic information.

Advantages of the invention may include one or more of the following. Consumers may enjoy videos in which they are the main actor, but rather than just in a home movie, the video may have big-budget product values and may even be a portion or all of a popular release. The consumer may enjoy a DVD that they can share with family and friends. The process of creating the DVD may take only a few minutes, all without any "acting" from the consumer other than being photographed.

Other advantages and features of the invention will be apparent from the description that follows, including the drawings and claims.

DETAILED DESCRIPTION

Figure 1:
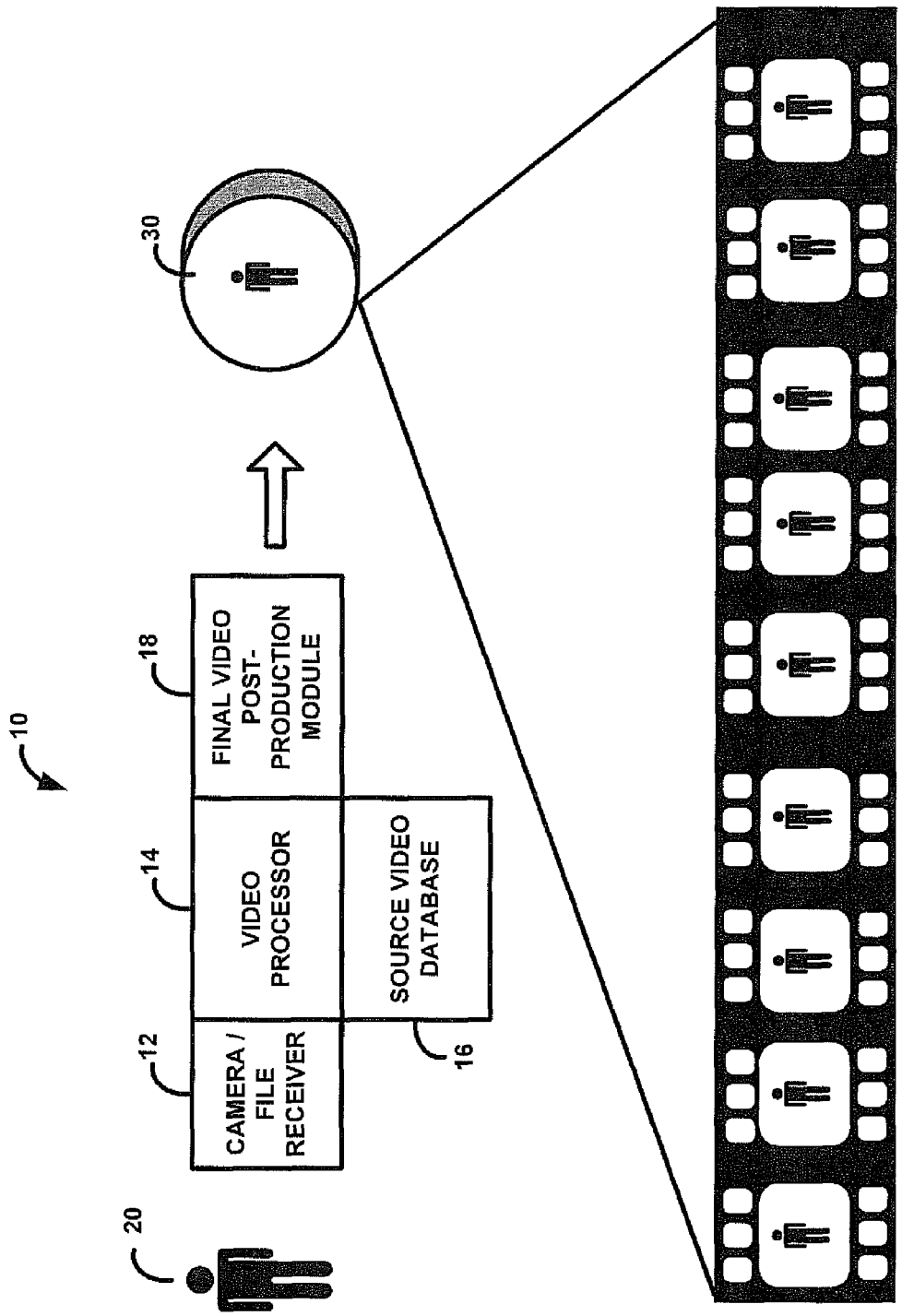
FIG. 1 schematically illustrates the modular layout of a system according to an embodiment of the invention.
Figure 2:
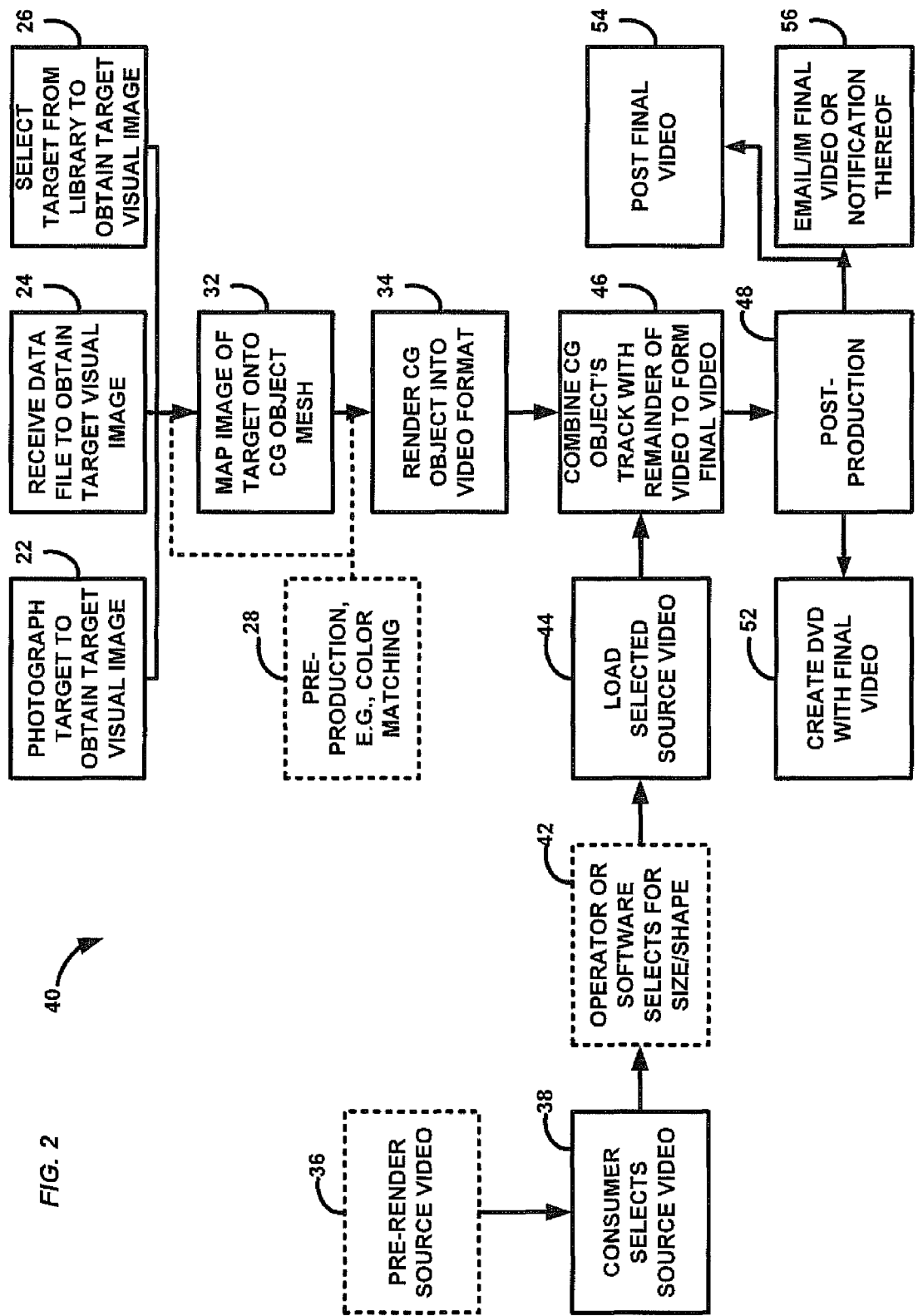
FIG. 2 is a flowchart illustrating a method according to an embodiment of the invention.
Figures 3, 4:
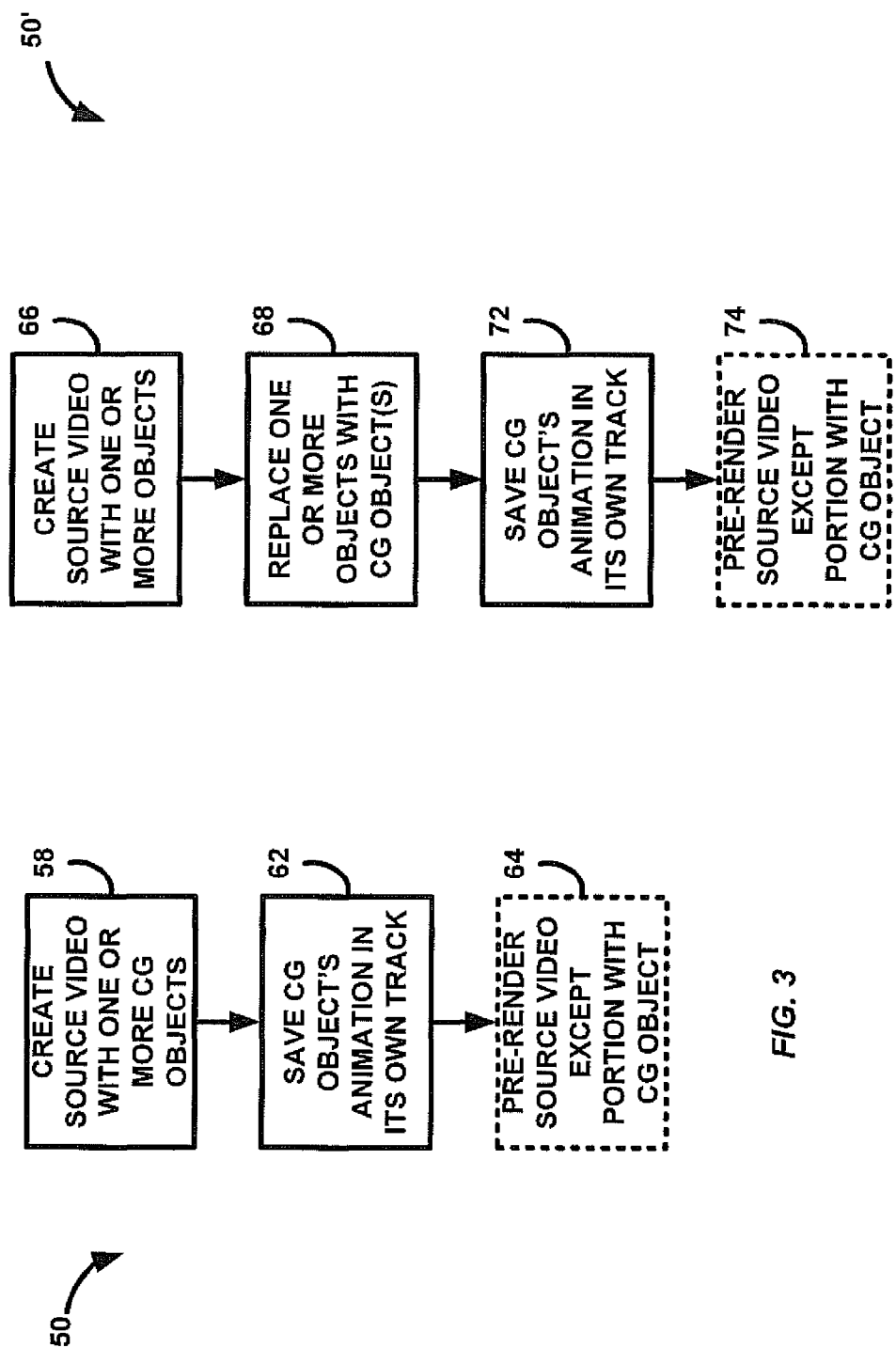
FIG. 3 is a flowchart illustrating a method of making a source video according to an embodiment of the invention.
FIG. 4 is a flowchart illustrating another method of making a source video according to another embodiment of the invention.
Figure 5:
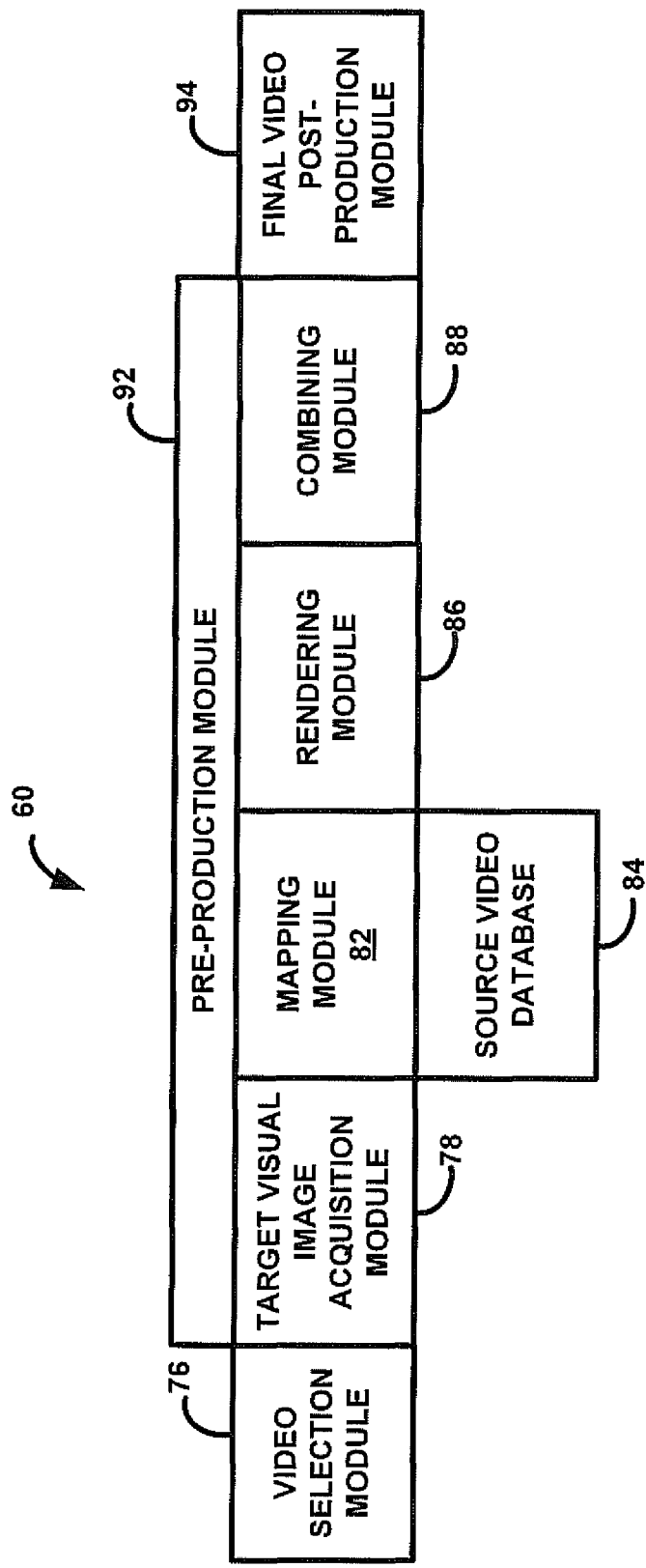
FIG. 5 schematically illustrates the modular layout of a system according to another embodiment of the invention.

The below description provides various systems and methods for inclusion and display of user or object attributes in an at least partially CG video. FIG. 1 describes a particular embodiment. FIGS. 2 and 5 provide a more general overview of a method and system, respectively. FIGS. 3 and 4 describe ways of creating source videos. And FIG. 6 describes an embodiment in which the system and method are employed for targeted advertising or product placement.

Referring to FIG. 1, a system 10 is shown that employs an image of a consumer 20, also called here a 'target', in a video. The image of the consumer 20 is captured, such as by the consumer being photographed by a camera 12. The camera may be specially calibrated for purposes of the system. The camera may be replaced in some embodiments by a module which can receive files. For example, a consumer may bring to the system 10 a disk or other medium containing electronic data files in which is stored the target visual image data, and the system 10 may have a disk drive or other input by which the target visual image data may be received.

The system 10 includes a source video database 16, for storage of source video files. The source video database 16 may store a single source video, or may include many source videos. For example, the source video database 16 may includes videos from a number of different movie genres, in order to give the consumer a selection of the type of video in which they wish to be featured. It is understood that the source video database 16 need not be physically disposed in the same location as the system 10. For example, there may be a central location for storage of files and the same may be transmitted to the system 10 when required, e.g., on-demand.

Using methods described in greater detail below, a video processor 14 combines the target visual image and the source video in such a way as to display the target visual image within the source video. In other words, the target visual image appears to be part of the source video in the final video. For example, in the case where the target visual image is a consumer and the source video is a short action film, the consumer appears to be an actor within the short action film.

A post-production module 18 takes or performs desired actions with the final video, such as creating a DVD 30, posting the final video to a file-sharing site, emailing the final video, and so on. More details of the post-production module are described below.

FIG. 2 shows a flowchart of a method 40 for inclusion and display of user attributes in an at least partially CG video. The method starts with the acquisition of a target visual image. In one configuration, a target, such as a consumer, is photographed in order to obtain the target visual image (step 22). The photographing of the target may be from a number of angles, in order to obtain a significant amount of visual data about the target. In another configuration, a data file is received which contains data about the target visual image (step 24). For example, a DVD, CD-ROM, flashdrive, jumpdrive, or any other data carrier may be employed to acquire the target visual image. Similarly, the data file may be obtained by being emailed or otherwise downloaded.

In another configuration, the target visual image may be selected from a library of such files (step 26). The library may include, e.g., target visual images provided by users, images of celebrities, images of historical figures, images of products or other objects, and so on. A suitable user interface may be provided through which the consumer or operator may select the target image from the library.

Once a target visual image is obtained, the same may be mapped onto a mesh defining a graphical object model, here termed a CG object (step 32). For example, if the target visual image is a product, the image may be mapped onto a CG object that is also a product. Such a system may be particularly useful for demographically-targeted product placement as described below. As another example, if the target visual image is of a consumer's head, the image may be mapped onto a CG character's head, making the consumer appear to be a character in the movie. The CG object is typically formatted such that the remainder of the scene is a blue-screen background, to allow combination with a source video. The mesh forming the CG object may then computationally form all the image viewing angles needed for the video, as well as any facial expressions or other movements required.

For example, a user can select a source video with a given character in a scene and have the system change the appearance of the character to resemble the user's appearance. In another example, the user can select a source video with a given object (e.g., a car) and have the system modify the object to resemble the target (e.g., a different model or color of car). The more data that is available for a target and the more the target data resembles the conditions of the source image, the better the resulting modified image will generally appear.

Where the source video has multiple CG objects, the user may insert the target visual image into one or more of the CG objects.

A pre-production step may occur (step 28). The pre-production step may be performed by an operator or by suitable image processing software. For example, the target visual image may have been acquired with significantly different lighting effects than that of the source video. In this case, the pre-production step may perform a level of color-matching or the like. Such a step may be performed prior to or following the mapping step (step 32).

Following the mapping step and any pre-production, the CG object with the mapped visual image data may be rendered into a suitable video format (step 34).

Prior to, during, or following one or more of the steps 22-34, the source video may be chosen. In particular, one or more source videos are prepared, which may be short films particularly made for purposes of the system, or may be already-prepared films that are adapted for purposes of the system. The source videos may be pre-rendered (step 36). A consumer selects a source video (step 38), typically from an assortment of genres. In one implementation, the selection of source video indicates one or more CG objects and so indicates what target visual images need to be acquired (e.g., resulting in prompts to a user through a software user interface).

While the basic methods for creating source videos are discussed below in connection with FIGS. 3 and 4, here it is generally noted that each source video has, or is caused to have, at least one CG object, which may be, e.g., a product or a character, and the CG object may have its own animation track. Head textures are created from the target visual image data, such as from a consumer's head image, optionally stored in a separate file, and then the head textures are mapped onto the head of the CG character. In this way, the CG character's animation track is modified to include the image information of the consumer. In the method of FIG. 3 below, the image information may be directly mapped onto a CG object, creating a modified animation track. In FIG. 4, the method is similar except that the CG object is created in a separate step, based on a desired object to be replaced.

In some implementations, several versions of source videos may be prepared, each with a different size or shape of CG object, i.e., with different size meshes. In this way, e.g., in the character implementation, different target visual image body types or head shapes may be accommodated. An operator or a software application may select the source video that has a CG object shaped most comparably to that of the target visual image (step 42).

The selected source video is then loaded into the system (step 44). This loading may be highly transitory, highly permanent, or at any level in between. In any case, the loading is such that the rendered CG object from step 34, in some implementations with a blue-screen background, may be combined with the source video in order to form a final video (step 46).

The combination may be an addition of the rendered CG object animation track with the source video. In some situations, if the source video has not been rendered, then the CG object may be mixed with other CG objects in the source video file and the combination rendered at once to form the final video.

Following the combination step 46, a post-production step (step 48) may occur. The post-production step may include creating a DVD (or other such data carrier) with the final video disposed thereon (step 52). Another post-production step, which may be carried out in place of or in addition to step 52, is to post the final video on a file-sharing site, such as Crackle™ (step 54). Another post-production step, which may be carried out in place of or in addition to steps 52 or 54, is to transmit the final video, or a notification thereof, to the consumer or to a share group set up by the consumer (step 56), where a share group is one or more users associated with the consumer. The transmission step 56 may occur via email, instant message, or via any other transmission method.

FIGS. 3 and 4 are flowcharts illustrating two methods for creating and preparing source videos for inclusion and display of user attributes in an at least partially CG video. The source image or video can be real image data (e.g., captured by a camera) or CG (e.g., generated by a computer system for animation or a game).

In FIG. 3, the method 50 begins with the creation of a source video with one or more CG objects (step 58). The CG objects may be, e.g., one or more objects or products, characters, a portion of a character, an area, a map, and so on. The CC object may have its own animation track, and the same may be saved separately (step 62).

One potential next step, which is optional, is to pre-render the source video except for a portion with the CG object (step 64). In other words, the source video may be rendered into a desired video format except for a portion with the CG object, and in particular the portion of the CG object that is desired to be replaced by a target image. However, in another embodiment, the entirety of the source video may be rendered, and then the portion with the CG object may be replaced or substituted with the target image.

In FIG. 4, the method 50' begins with the creation of a source video with one or more objects (step 58). The objects in this embodiment are not CG objects, but constitute raw object data that may again represent, e.g., products, characters, a portion of a character, and so on. Using software processing methods, one or more objects in the source video are then replaced or substituted with equivalent CG objects (step 68). In one implementation, the area of the replacement (for the equivalent CG object) is chosen based on the geometric characteristics of the replacement object (to be seen in the final video). As before, the CG objects may have their own animation tracks, and the same may be saved separately (step 72). A potential next step is to pre-render the source video (step 74), and the remarks above with respect to the analogous step 64 apply in the same way.

FIG. 5 shows a more detailed system 60 for inclusion and display of user attributes in an at least partially CG video. A video selection module 76 is provided through which users or consumers may choose a source video. In many cases, an assortment of source videos may be provided, of varying genres. A user interface may be provided which allows an operator or a consumer to select the source video from among an array of choices.

The source videos are stored in a source video database 84, which may be resident within the system 60 or which may be stored elsewhere as described above. A target visual image acquisition module 78 is employed to photograph the target, e.g., from one or more angles. In an alternative or complementary arrangement, the same may be used to receive a data carrier, e.g., a computer disk or drive, on which data is stored corresponding to the target visual image.

A mapping module 82 is used to map the target visual image onto a CC object in the source video. For example, the mapping module may be used to map head image data of a consumer onto the head of a CG actor.

A rendering module 86 then renders the separate animation track of the CG object with the mapped target image data into a desired movie format. A combining module 88 combines the rendered track with the remainder of the source video. In the case where the source video is not pre-rendered, the combining module combines the CG or other objects first, and then the rendering module renders the entire collection into a desired movie format.

At any point during the target visual image acquisition, the mapping, the rendering, or the combining, a pre-production module 92 may perform minor adjustments, such as adjusting the color matching or the like, in order to create a final video with a desired quality, e.g., a desired level of photorealism. The pre-production module 92 may be controlled by an operator, by the consumer, or automatically by a software application. In the case where the pre-production module 92 is controlled by an operator or the consumer, a suitable user interface and display may be provided. A preview function may be used to allow the operator or consumer to visualize the effect of the modification they are causing. The user interface may allow the user to choose a quantitative degree of modification. For example, the user may choose to lighten or darken the perceived ambient lighting in the target image by 50%. In another example, a number of choices may be given to the user to select and the effects of the modifications displayed, e.g., lightening and darkening by 25%, 50%, 75%, and 100%.

A final video post-production module 94 is employed to take the final video and perform one or more actions on the same. For example, the final video post-production module 94 may modify a data carrier such as a DVD in such a way that the final video is stored thereon. The post-production module 94 may post the final video to a file-sharing site, or transmit the final video, or a notification thereof, to the consumer or to whomever the consumer desires.

Of course, these modules may be physically resident on any number of computing devices, and may employ an appropriate protocol to communicate between each other.

Figure 6:
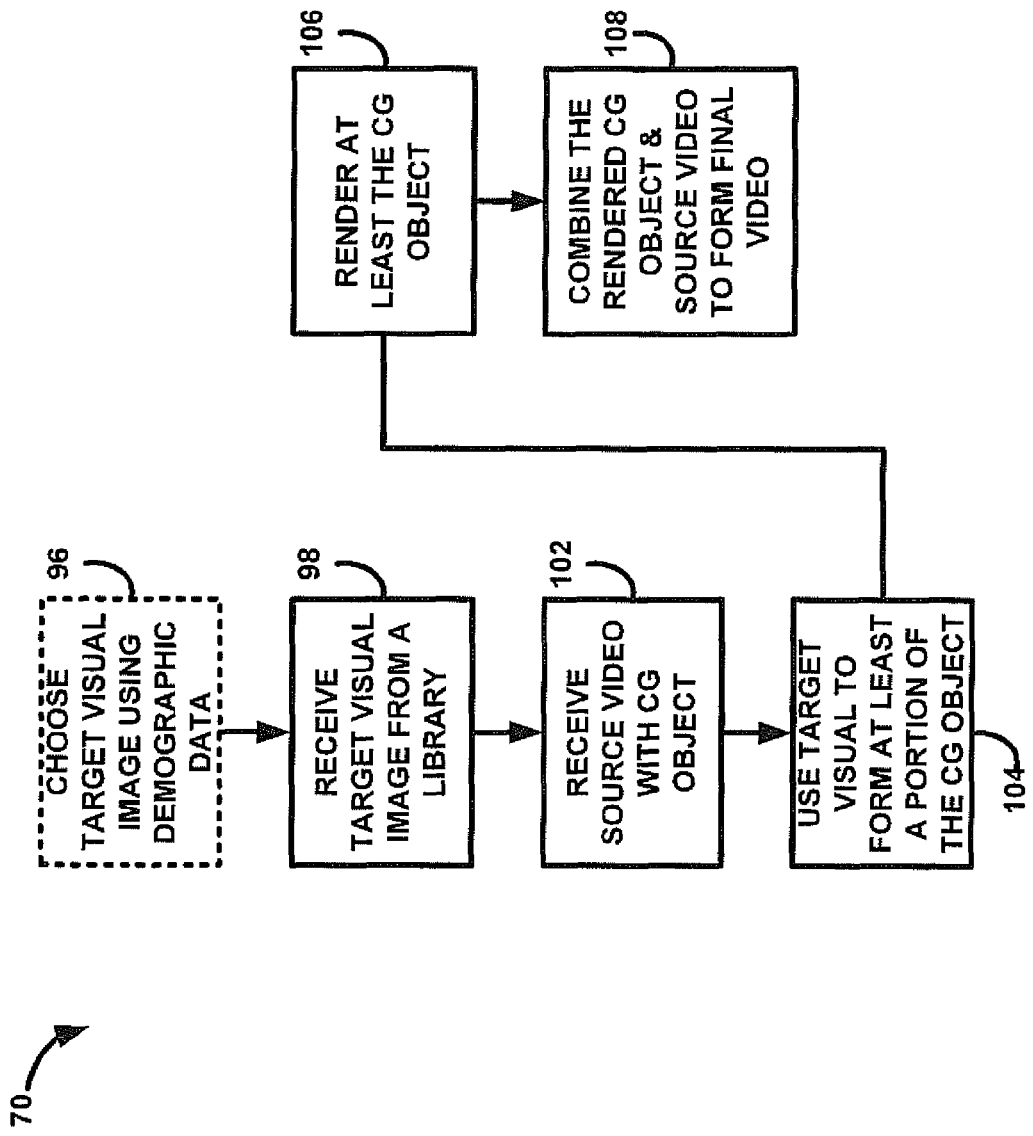
FIG. 6 is a flowchart illustrating a method according to another embodiment of the invention.

Referring to FIG. 6, a flowchart is shown to more explicitly describe a method 70 for display of object features in an at least partially CG video, more particularly for targeted advertising. A first step is to choose a target visual image (step 96). The choice may be determined based on, e.g., demographic data about the audience for the video, if known.

Once identified, the chosen target visual image may be retrieved and received from a library (step 98). The target visual image library may be small or large, depending on the number of products and the number of demographic groups to be targeted.

A source video is then received with a CG object. In this case, the source video may be a movie, TV show, music video, computer game, or any such video in which a targeted product placement is desired.

The target visual image is then mapped onto the CG object mesh (step 104), and the CG object is rendered (step 106). As noted above, the entire video can be rendered at once if desired, e.g., if the source video is not pre-rendered. The rendered CG object and the source video are then combined to form the final video (step 108).

For example, the CG object may be the side of a bus, a billboard, a soda pop can, or the like. The target visual image in combination with the CG object can then be used to advertise a product such as a local restaurant on the billboard, a local business on the side of the bus, and a local beverage on the can.

In more detail, the target visual image data is used to replace an object for advertising purposes. For example, a source video may include an advertising object such as a billboard advertising a particular restaurant. The system changes the part of the billboard advertising the first restaurant so that the billboard then shows advertising for a second restaurant. This substitution would be particularly useful for regionally targeted advertising. Various advertising objects could be used, such as storefronts, television screens, bus advertising, etc. The target to use for replacement could be selected by the author of the source video (e.g., for different distribution venues), by the user, or by the provider/distributor of the video data. In one such example, the system selects replacement advertising based on demographic information or user profile information for the purchaser or a designated user. In another example, the system uses image analysis of other target replacement data to select advertising (e.g., estimating gender and age of a person, or recognizing a person to access a corresponding profile).

According to embodiments of the present invention, as fully described above, systems and methods are provided for displaying user-chosen target video image data to appear in an at least partially CG video.

Variations of the above description will be apparent to one of skill in the art given this teaching. For example, the modules described may be spread over two or more networked systems or servers, rather than only within one kiosk or store. The system and method may be embodied in a software application that may be distributed to end users. The system may also be provided as an online service, e.g., where the consumer selects the target visual image from a library or uploads a file with the target image thereon. In this case, the consumer may be instructed via an on-screen menu or other user interface to make visual image data, such as the image of a head or face, accessible for use by the system and method.

Moreover, while the discussion above has focused on videos that are short films, other types of video content items can also be created, such as, but not limited to, music videos, instructional videos, full-length features, extreme or other sports videos, and so on. For example, in one implementation, a system automatically locates certain types of objects (e.g., faces or advertisements of a particular type or advertiser), builds tracks for those objects, and replaces part, or all, of the object using a target image. In one such example, scenes of a public area that have been captured are modified to replace the faces of people in the scene with faces of actors to protect the privacy of the people in the original scenes. In another example, advertisements of a competitor captured in video are replaced with advertisements selected by the company preparing the video.

Another implementation includes replacing a CG actor's head (or that of a stuntman) with that of a movie star, especially for scenes that are dangerous to produce, in order to make the movie star appear to be in the dangerous scenes. With suitable graphic processing, the system and method may be applied to create animated videos of any length, including anime productions, and so on. With multiple CG actors, an entire family may be imaged and used to replace CG actors in a source video. The system and method may further allow the CG actor with the mapped visual image data to speak or sing with suitable "lip-sync'ing". In certain embodiments, voice samples may be obtained and used to generate a voice for the CG actor.

The discussion has focused on CG objects such as products and head image data. However, the system may image the entire body, a portion thereof, or indeed any object capable of being imaged.

One implementation includes one or more programmable processors and corresponding computer system components to store and execute computer instructions, such as to provide the computer systems implementing the kiosk system, those required to generate, store, use, and select source videos, those required to record target images or video, and those required to modify the source video using the target data. In one implementation, the computer system includes user interface features and retail sales features to allow a user to control the operation of the system and to allow a user to process financial transactions (e.g., credit card sales).

Additional variations and implementations are also possible. For example, while the discussion above focuses on video, implementations could be developed for still images, video games, or audio as well. In one example, a user provides image data to a game system and the game system uses that data to create the appearance of a character in a role-playing game, or for a game in any genre and in any format.

While the term "computer" has been used, this term is intended to encompass any computing machine, including desktop computers, laptop computers, handheld computers, tablet computers, smart phones, personal digital assistants, and any other device to or from which data may be transferred. Various other examples could also be formulated given this teaching.

While the invention has been described with respect to certain embodiments, it should be clear to one of ordinary skill in the art, given this teaching, that the invention is much broader than the embodiments shown. Accordingly, the description represents some, but not all, representations, and therefore the scope of this invention is to be limited only by the claims appended to this description.

What is claimed is:

1. A method of making a video employing a target visual image, comprising:
   a. receiving a target visual image;
   b. receiving a source video, the source video including a track in which a computer-generated object is defined, the computer-generated object including a pre-defined mesh and being defined in a particular region where the source video is unrendered, and choosing a size or shape or both of the computer-generated object or target visual image to match the other;
   c. mapping data corresponding to the target visual image onto the pre-defined mesh constituting the computer-generated object to generate image textures thereon;
   d. rendering at least the computer-generated object into a video format; and
   e. combining the rendered computer-generated object and the source video to form a final video.

2. The method of claim 1, wherein the receiving a target visual image includes capturing an image of a face of the consumer.

3. The method of claim 2, wherein the capturing an image includes photographing a head of the consumer from multiple angles.

4. The method of claim 1, wherein the source video is pre-rendered except in the region of the computer-generated object.

5. The method of claim 1, wherein the receiving a source video includes:
   a. receiving a video including raw object data; and
   b. replacing the raw object data with a computer-generated object to produce a source video.

6. The method of claim 1, wherein the target visual image is of a subject selected from a media library.

7. The method of claim 1, wherein the receiving a target visual image includes receiving a data file including visual information.

8. The method of claim 1, further comprising creating a medium with the final video thereon, posting the final video to a file-sharing site, or emailing the final video to an email address.

9. The method of claim 1, wherein the target visual image is selected from the group consisting of: a consumer's body, a consumer's head, a consumer's face, and a product.

10. The method of claim 1, wherein the receiving a source video includes selecting a source video in which the size or shape of a computer-generated object within the source video corresponds to the size or shape of the target visual image.

11. The method of claim 10, wherein the selecting is performed by an operator or by a software application.

12. A system for making a video employing a target visual image from a consumer, comprising:

a. a target visual image acquisition module to receive target visual image data;
b. a database to store one or more source videos, each source video including a track in which a computer-generated object is defined, the computer-generated object including a pre-defined mesh and being defined in a particular region where the source video is unrendered;
c. a mapping module to map the target visual image data onto at least a portion of the pre-defined mesh corresponding to the computer-generated object to generate image textures thereon, the mapping module further choosing a size or shape or both of the computer-generated object or target visual image to match the other;
d. a rendering module to render the computer-generated object into a video format; and
e. a combining module to combine the rendered portion of the computer-generated object with the source video to produce a final video.

13. The system of claim 12, further comprising a post-production module which creates a DVD with the final video stored thereon, posts the final video to a file-sharing site, or emails the final video to an email address.

14. The system of claim 12, wherein the computer-generated object is a computer-generated character, and wherein the target visual image reception module receives head image data, and wherein the mapping module maps the head image data onto a head area of a mesh corresponding to the computer-generated character.

15. The system of claim 12, wherein the target visual image reception module includes a camera or a data carrier receiver.

16. A method for creating a short film in which a consumer is displayed as an actor therein, comprising:
a. photographing a consumer from at least two angles, and storing the photographic data obtained thereby;
b. receiving a video choice from a consumer, the choice corresponding to a selection of a source video from an assortment of at least two source videos, each source video having at least one track for a computer-generated actor, and wherein the video is pre-rendered except for a head area of the computer-generated actor;
c. choosing a size or shape or both of the photographic data of the consumer or head area to match the other, the choosing resulting in a selection for use of a computer-generated actor including a pre-defined mesh;
d. mapping the photographic data of the consumer onto the pre-defined mesh of the head area of the computer-generated actor to generate image textures thereon;
e. rendering at least the computer-generated actor with the mapped photographic data into a video format;
f. combining the results of the rendering with the source video to result in a final video; and
g. recording data corresponding to the final video onto a DVD.

17. The method of claim 16, further comprising:
a. photographing another consumer from at least two angles, and storing the photographic data obtained thereby;
b. mapping the photographic data onto the head area of another computer-generated actor; and
c. rendering the computer-generated actor and the another computer-generated actor into a video format.

18. The method of claim 16, wherein the photographing, receiving, mapping, rendering, combining, and manufacturing are performed in a kiosk.

19. The method of claim 16, further comprising providing a user interface wherein the consumer can select the source video and control the photographing step.

20. A method of advertising within videos employing targeted visual images, comprising:
a. receiving a target visual image from a library of target visual images;
b. receiving a source video, the source video including a track in which a computer-generated object is defined, the computer-generated object being defined in a particular region where the source video is unrendered, and choosing a size or shape or both of the computer-generated object or target visual image to match the other, the choosing resulting in a selection of a computer-generated object including a pre-defined mesh;
c. mapping data from the target visual image onto at least a portion of the computer-generated object to generate image textures thereon;
d. rendering at least the computer-generated object into a video format; and
e. combining the rendered computer-generated object and the source video to form a final video.

21. The method of claim 20, further comprising receiving demographic information about a target audience of the final video, and wherein the receiving a target visual image step includes choosing a target visual image from a library based on the demographic information.

* * * * *